Patented Dec. 5, 1944

2,364,377

UNITED STATES PATENT OFFICE 2,364,377

PROCESS FOR THE PREPARATION OF BUTADIENE

Allen Everett Lawrence, Wilmington, Del., assignor to E. I. du Pont de Nemours & Company, Wilmington, Del., a corporation of Delaware No Drawing. Application May 8, 1942,
Serial No. 442,227

13 Claims. (Cl. 260—680)

The present invention relates to a process for the preparation of olefines and diolefines from cyclohexane and more particularly to a process for recovering butadiene from hydrocarbon mixtures obtained by the thermal splitting of cyclohexane.

1,3-butadiene may be prepared by passing a mixture of acetylene and proplyene through red hot tubes (Ann. de Chim. et Phys. (4) 9, 466; (5) 10, 186); by the decomposition of cyclohexane in the presence of contact bodies such as hot surfaces electrically heated to a dark red heat, (Hoffman et al. U. S. Patent 1,050,077); by the dehydrogenation of the mono-olefines such as ethylene, propylene, butylene; and by other well-known processes. The gaseous product of these reactions contains in addition to butadiene other gases from which the butadiene must be separated. Considerable difficulty has been encountered in effecting the separation because of the similarity in physical and chemical properties between the butadiene and the other gases present.

An object of the present invention is to provide an improved process for the separation of diolefines from hydrocarbon vapors containing them. Another object of the invention is to provide an improved process for the separation of butadiene from a mixture of hydrocarbon vapors containing it. Yet another object is to provide a process for the recovery of butadiene and unconverted cyclohexane from the reaction vapors obtained by the pyrolytic splitting of cyclohexane wherein the vapors are absorbed in a liquid hydrocarbon. Still another object is to provide a recovery system wherein a mixture of vapors containing butadiene is subjected to scrubbing with a liquid hydrocarbon in a plurality of stages, one at least being under pressure. Other objects and advantages of the invention will hereinafter appear.

The formation of butadiene from cyclohexane is believed to take place in accord with the following equation:

$$C_6H_{12} \rightarrow CH_2:CH.CH:CH_2 + C_2H_4 + H_2$$

Practically, however, it has been found that other reactions occur simultaneously leading to the formation of ethylene, propylene, acetylene, saturated hydrocarbons and high molecular weight products. Similarly when butadiene is made by other well-known processes, such, for example, as by the dehydrogenation of the monoolefines, by the interaction of acetylene and propylene and the like, the gaseous mixtures obtained contain many products other than butadiene. In accord with the present invention it has been found that the butadiene can be recovered efficiently and economically from such mixtures by subjecting them to absorption in a suitable liquid hydrocarbon. After such treatment the butadiene which, it will be found, has been preferentially absorbed at the expense of the more volatile gases present may be recovered from the absorption liquid by simple distillation and/or rectification.

Another feature of the invention involves carrying out the absorption in a plurality of pressure stages, for example, the butadiene containing gases resulting from the pyrolysis of cyclohexane and after cooling, are first passed countercurrent to the flow of liquid hydrocarbon in a scrubber maintained at approximately atmospheric pressure, the major portion of the vapors absorbed under this pressure will be found to be of higher boiling point than the butadiene, although because of solubility effects some butadiene will be scrubbed from the vapors. The gases issuing from this scrubber are compressed and then passed into a second or pressure scrubber wherein they are scrubbed by a hydrocarbon similar or dissimilar to the first under pressure and in this scrubbing step substantially all of the butadiene in the vapors is absorbed. When the vapors from the pyrolysis of cyclohexane are treated by my process, it will be found that substantially all of the cyclohexane not condensed during the cooling will be absorbed in the first scrubber and substantially all of the butadiene that passes the first scrubber will be absorbed in the pressure scrubber. If desired, the scrubbing may be effected in a number of stages although generally and particularly with gases from the pyrolysis of cyclohexane, two stages are sufficient for recovery of butadiene present.

The following examples will illustrate preferred embodiments of the invention in which parts are by molar weight unless otherwise indicated.

*Example 1.*—Into a reaction converter of refractory material cyclohexane is injected together with 10% by weight of oxygen in the form of air. As a result of the combustion the cyclohexane is raised to a temperature between 700 and 800° C., and substantially immediately after reaching this temperature at which time the pyrolytic cracking of the cyclohexane to butadiene occurs the reaction gases are plunged into water at a temperature of approximately 35° C. The condensed cyclohexane, from the water cooling operation, will be found to contain in the order of 20% of the butadiene synthesized. The uncondensed vapors from the cooling operation are passed into the bottom of a scrubbing tower, through which a scrubbing liquid consisting of cyclohexane is passed counter-current to the flow of the reaction vapors. The unabsorbed reaction vapors pass from this scrubbing operation into a compressor wherein the vapors are compressed to approximately 5 atmospheres pressure; they are then introduced into the bottom of a second scrubber wherein they again pass counter-current to the flow of cyclohexane, being herein scrubbed under a pressure of approximately 5 atmospheres. The temperature of scrubbing in both scrubbers is maintained at approximately 40° C. The liquid effluent from the first scrubber will contain approximately 4.5% of the butadiene present in the gases from the reaction and the liquid effluent from the second scrubber will contain approximately 75.5% of the butadiene on that basis. The cooling and scrubbing operations result in substantially complete removal of the butadiene from the reaction vapors.

The liquid effluent from the first and second scrubbing operations may be separately or conjointly subjected to distillation followed by rectification for the recovery of the butadiene from the cyclohexane; the distillation of the liquid effluent from the pressure scrubber preferably, however, is carried out under the pressure of scrubbing, whereby the butadiene can be condensed from the vapors without resorting to the use of refrigeration for cooling the condenser.

In lieu of supplying the heat for the reaction by combustion with oxygen, a mixture of oxygen, as air, with blue gas, water gas, or other industrial gas of similar heating value may be used if desired.

*Example 2.*—A reaction gas resulting from the pyrolysis of cyclohexane and containing approximately on a weight basis 700 parts of cyclohexane, 100 parts of butadiene, 60 parts of ethylene, 10 parts of propylene, and approximately 40 parts of hydrogen and other saturated hydrocarbons, is plunged immediately after pyrolysis into water at a temperature of approximately 35° C. wherein approximately 620 parts of the cyclohexane is condensed, this cyclohexane having absorbed about 20 parts of the butadiene. The gas issuing from this condenser is passed into a scrubber counter-current to the flow of a light petroleum oil such as "straw oil" having an S. A. E. viscosity of about 10. Approximately 1,000 parts of oil will absorb in this scrubber, 73.5 parts of cyclohexane, and 4.5 parts of butadiene. The gases issuing from the top of this absorber contain approximately 50.5% butadiene, 37% ethylene, the remainder being hydrogen and saturated hydrocarbons. This gaseous mixture is compressed to 75 pounds per square inch and introuced into another absorber wherein it flows countercurrent to the flow of "straw oil" as the scrubbing liquid. The liquid effluent from this absorber contains 75.5 parts of the butadiene and a small amount of saturated hydrocarbons per 2,000 parts of the oil. The liquid effluent from the first and second scrubbers are subjected separately to steam distillation, and the butadiene therefrom combined and rectified for the recovery, together with the butadiene recovered from the condensed cyclohexane, of substantially 100% of the butadiene present in the gas treated.

The liquid hydrocarbon which may be used for absorbing butadiene in accord with this invention may be any suitable hydrocarbon which is inert to butadiene and the other gaseous hydrocarbons present in the reaction vapors and as examples of which may be included cyclohexane, light petroleum oils generally, solvent naphtha, benzine, xylene, toluene, etc. Vapor mixtures from the splitting of cyclohexane should be treated preferably with liquid hydrocarbons having a boiling point above approximately 80° C. and having an S. A. E. viscosity of less than 30.

Very satisfactory results can be realized with substantially complete stripping of the butadiene from the reaction gases if the scrubbing is effected at normal temperatures although if desired temperatures down to 10-15° C. may be employed in either the first or subsequent scrubbers. With respect to the pressures employed in the scrubbers it has been determined that with a pressure of one atmosphere in the first scrubber and between 2 and 30 atmospheres in the second scrubber, excellent recovery of the butadiene is possible although, if desired, other pressures such as subatmospheric pressures in the first, and atmospheric or higher pressures in the second may be employed. The higher pressure should preferably be employed in the final stages in order to remove the butadiene with the use of practical amounts of the scrubbing liquid. With a differential pressure between the scrubbers an excess of scrubbing liquid should be used in the second scrubber over that used in the first and for optimum results with a pressure ratio between the scrubbers of 1:5 the throughput of absorbing liquid should be approximately 1:2.

I claim:

1. In a process for the preparation of butadiene, the steps which comprise pyrolyzing cyclohexane and recovering the butadiene from the reaction vapors by absorption in a liquid hydrocarbon, the absorption being conducted in a plurality of stages maintained under different pressures.

2. In a process for the preparation of butadiene the steps which comprise pyrolyzing cyclohexane and recovering the butadiene and unconverted cyclohexane from the reaction vapors by absorption in a liquid hydrocarbon at one pressure followed by absorption at a higher pressure.

3. In a process for the preparation of butadiene the steps which comprise pyrolyzing cyclohexane and recovering the butadiene and unconverted cyclohexane from the reaction vapors by absorption of the unconverted cyclohexane in a liquid hydrocarbon at one pressure followed by absorption of the butadiene at a higher pressure.

4. In a process for the preparation of butadiene the steps which comprise pyrolyzing cyclohexane, cooling the reaction vapors, subjecting the cooled vapors to absorption in a liquid hydrocarbon in two stages, conducting the absorption in the first stage at substantially atmospheric pressure and in the second stage at a pressure of from 5-30 atmospheres.

5. The process in accord with claim 4 in which the butadiene is recovered from the liquid hydrocarbon of the second stage without reducing the pressure.

6. In a process for the preparation of butadiene the steps which comprise pyrolyzing cyclohexane, cooling the reaction vapors, subjecting the cooled vapors to absorption in a liquid hydrocarbon in two stages, conducting the absorption of a major portion of the unconverted cyclohexane in the first stage at substantially atmospheric pressure and of a major portion of the butadiene in the second stage at a pressure of from 5-30 atmospheres.

7. In a process for the preparation of butadiene the steps which comprise pyrolyzing cyclohexane, cooling the reaction vapors, subjecting the uncondensed reaction vapors to absorption in a liquid hydrocarbon other than cyclohexane, compressing unabsorbed vapors from said absorption and subjecting the thus compressed vapors to absorption in a liquid hydrocarbon other than cyclohexane under pressure, and finally recovering the butadiene and unconverted cyclohexane from the liquid hydrocarbon in which they are absorbed.

8. In a process for the preparation of butadiene, the steps which comprise pyrolyzing cyclohexane, recovering the butadiene and unconverted cyclohexane from the reaction vapors by absorption in a plurality of stages under different pressures and in a liquid hydrocarbon, boiling above approximately 80° C.

9. In a process for the preparation of butadiene, the steps which comprise pyrolyzing cyclohexane, recovering the butadiene and unconverted cyclohexane from the reaction vapors by absorption in cyclohexane in a plurality of stages under different pressures.

10. In a process for the preparation of butadiene, the steps which comprise pyrolyzing cyclohexane, cooling the reaction vapors from the pyrolysis, subjecting the uncondensed vapors to absorption in a hydrocarbon oil having a boiling point above 80° C., compressing the unabsorbed vapors to a pressure of approximately 5 atmospheres, and subjecting them, under a pressure of approximately 5 atmospheres, to absorption in a hydrocarbon oil having a boiling point above 80° C. and finally recovering the butadiene and unconverted cyclohexane from the hydrocarbon oil absorbing liquid.

11. The process in accord with claim 10 in which the butadiene is recovered from the hydrocarbon oil of the pressure absorption without reducing the pressure.

12. In a process for the preparation of butadiene, the steps which comprise pyrolyzing cyclohexane, cooling the reaction vapors, subjecting the uncondensed vapors to absorption in cyclohexane, compressing the unabsorbed vapors to a pressure of 5 atmospheres and subjecting them to absorption under 5 atmospheres pressure in cyclohexane and finally recovering the butadiene from the cyclohexane absorbing liquid.

13. In a process for the preparation of butadiene, the steps which comprise pyrolyzing cyclohexane, cooling the reaction vapors by plunging them into water, subjecting the uncondensed vapors after said cooling to scrubbing with a light petroleum oil, compressing the unabsorbed vapors to a pressure of 5 atmospheres, subjecting them to scrubbing with a light petroleum oil under 5 atmospheres pressure and finally recovering the butadiene and unconverted cyclohexane by distillation from the cooling water and scrubbing oil.

ALLEN EVERETT LAWRENCE.